United States Patent Office 3,806,409
Patented Apr. 23, 1974

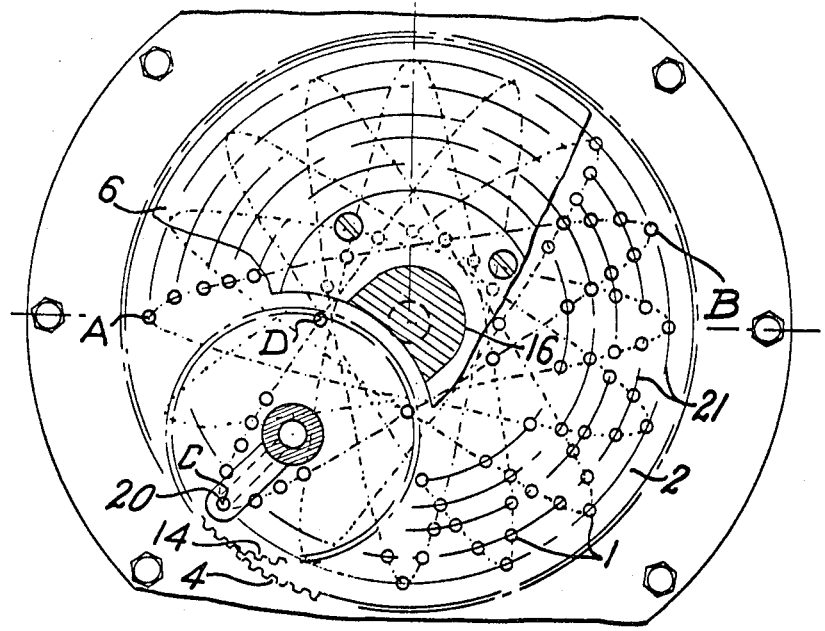
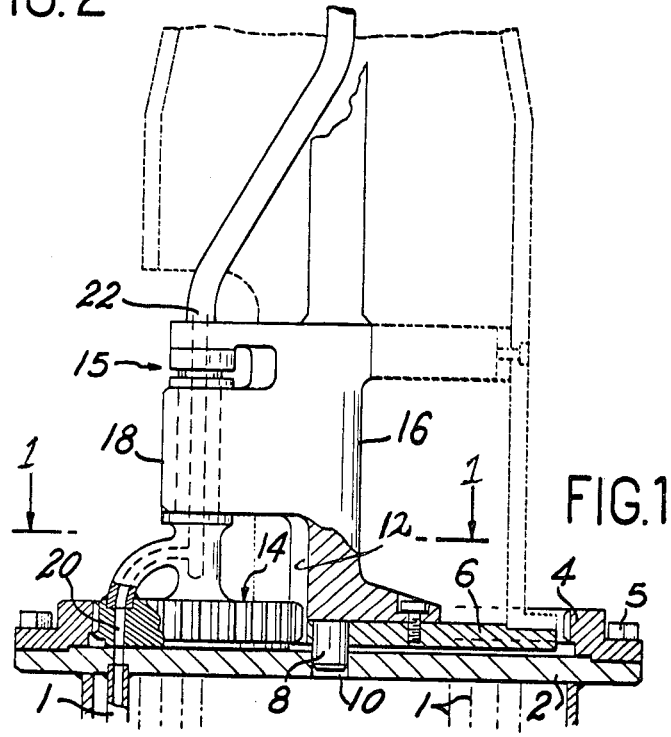
FIG.2
FIG.1

3,806,409
SAMPLING SELECTOR FOR BURST
CAN LOCALIZATION
Philippe Debergh, Massy, and Maurice Lagrange, Paris, France, assignors to Commissariat a l'Energie Atomique, Paris, France
Filed Mar. 6, 1972, Ser. No. 232,037
Claims priority, application France, Mar. 9, 1971, 7108067
Int. Cl. G21c *17/04*
U.S. Cl. 176—19 LD                                      6 Claims

ABSTRACT OF THE DISCLOSURE

The sampling selector comprises a distribution plate for tubes which serve to sample the coolant within all the fuel assemblies of a nuclear reactor, an internally-toothed sun gear fixed on the plate around the tubes, a turntable mounted within the sun gear, a planet gear rotatably mounted within a recess of the turntable and engaged with the sun gear, an eccentric duct extending through the planet gear and having its opening at the level of the distribution plate in order to convey the sampled fluid to a measuring device, and means for driving the turntable in rotation and displacing the planet-gear duct above the tubes in a succession of hypocycloid arcs.

---

Operational safety of nuclear reactors calls for very rapid detection of any burst can in a fuel assembly and also entails the need for accurate determination of the defective assembly.

With this objective, it is the customary practice to carry out continuous monitoring of the radioactivity either of the coolant itself or of the fission products which are entrained by the coolant and, as soon as this activity becomes normal, the defective assembly is located in two steps. The first step consists in monitoring all the assemblies in groups of three or four and the second step consists in monitoring in unitary sequence the assemblies of the group or groups which were located at the time of the initial monitoring operation.

Determination of the faulty assembly therefore requires two series of operations, one in order to determine the presumed location of the accident and the other in order to obtain accurate localization of the assembly or assemblies in which a can failure has occurred.

In order to simplify and accelerate this safety control operation, the present invention provides a selector which permits accurate and direct localization of the defective fuel assembly.

This invention is in fact directed to a sampling selector for burst can localization which comprises a distribution plate for tubes which serve to sample the coolant within all the fuel assemblies, an internally-toothed ring fixed on said plate around said tubes and constituting a sun gear, a turntable mounted to rotate within said sun gear and provided with at least one recess in which is mounted to rotate freely a toothed wheel engaged with said sun gear and constituting a planet gear, an eccentrically mounted duct for guiding the sampled fluid towards a measuring apparatus, said duct being adapted to pass through the planet gear and to open opposite to the distribution plate, and means for driving the turntable in rotation so as to cause the displacement of the planet-gear duct above the tubes in a succession of hypocycloid arcs.

The simple rotation of the turntable initiates step-by-step scanning of all the sampling tubes. A suitable choice of relative diameters of the planet gear and of the turntable in fact makes it possible to ensure that the succession of hypocycloid arcs forms a curve which passes through all the orifices of the sampling tubes so that these latter are scanned as a result of a predetermined number of revolutions of the turntable.

The positions of the sampling tubes and the angles of rotation which correspond to the transfer from one to the other being known, it is possible to carry out a rapid control and to locate defective fuel assemblies directly and with a high degree of accuracy.

The advantages and properties of the invention will in any case be clearly brought out by the following description of one embodiment which is given by way of non-limitative example and illustrated in the accompanying drawings, in which:

FIG. 1 is a fragmentary longitudinal sectional view of a sampling selector;

FIG. 2 is a diagrammatic sectional view taken along line I—I of FIG. 1;

Figure 3:
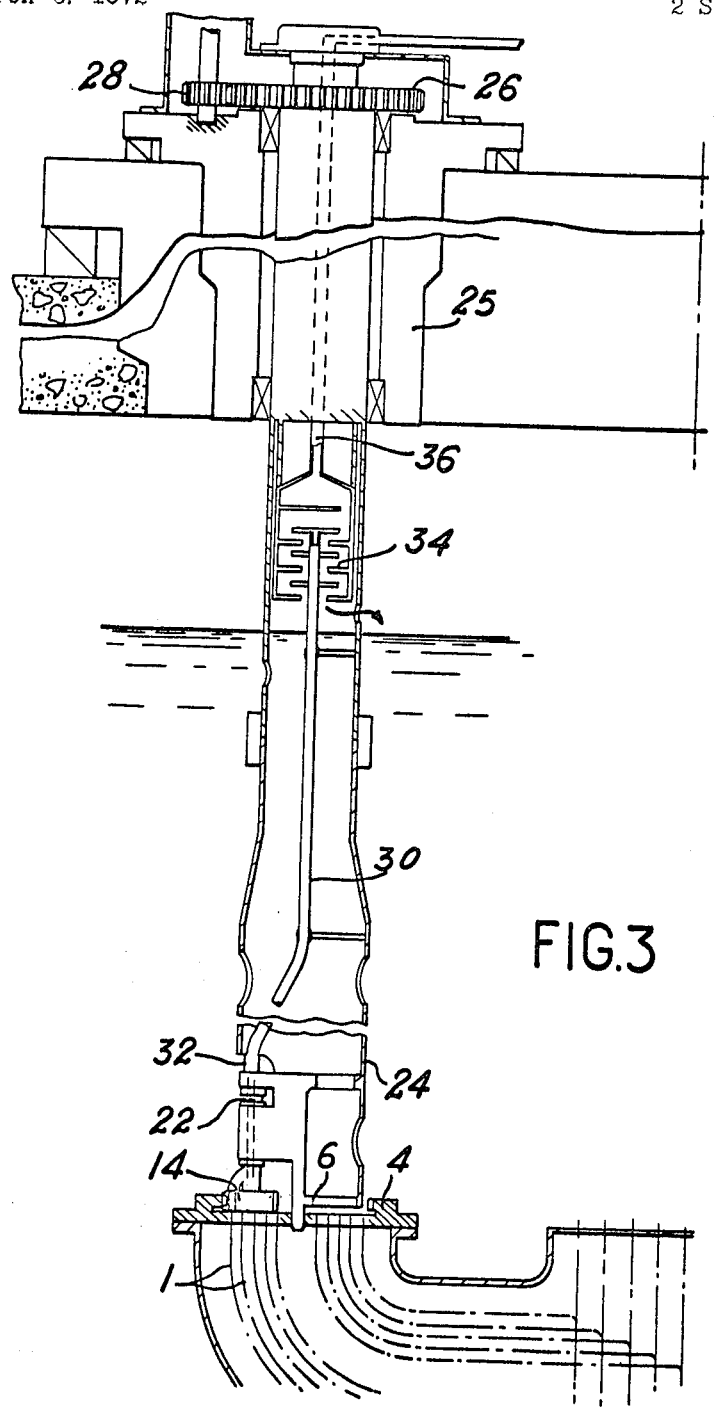
FIG. 3 is a longitudinal sectional view of a locating device comprising a selector in accordance with FIGS. 1 and 2.

In order to permit localization of a burst can in a nuclear reactor fuel assembly, sampling tubes 1 are connected to the extensions of the channels containing said fuel assemblies in order that the coolant which circulates within said channels may be permitted to flow in the direction of an analytical apparatus, each sampling tube being intended to correspond to one of the fuel channels or fuel assemblies.

As shown in FIG. 1, said tubes 1 are also fixed in a distribution plate 2 which is rigidly maintained in position and supports a ring 4 having internal teeth and constituting a sun gear which is secured in a fixed position by means of screws 5, for example, around the assembly of orifices of the tubes 1. A turntable 6 is freely mounted for rotation within the interior of the ring 4. Said turntable is parallel to the distribution plate and centered within this latter by means of a pin 8 which cooperates with a central hole 10 of said plate 2. Said turntable 6 is provided with a recess 12 of substantially circular shape in which is rotatably mounted a planet gear disposed in meshing engagement with the sun gear 4.

The planet gear 14 and the turntable 6 are mounted at the extremities of two parallel shafts 15 and 16 and are also coupled to each other by means of an arm 18 which is rigidly fixed to the shaft 16 but is secured to the planet-gear shaft 15 only against axial motion. In this arm 18, said shaft 15 is in fact free to rotate about its own axis. In consequence, any rotation of the turntable 6 within the ring 4 causes both the displacement of the planet gear 14 with said turntable 6 and the rotation of said planet gear about its own axis. Each tooth of the planet gear therefore describes a hypocycloid within the interior of the sun gear 4.

The planet gear 14 is traversed in the vicinity of its periphery by a duct 20 which has its opening opposite to the distribution plate 2 and is extended within the interior of the shaft 15 by means of a pipe 22 which provides a connection with an analytical apparatus (not shown).

The position of said duct 20 is determined as a function of the distribution of the tubes 1 in the plate 2 so as to permit coincidence of the orifice of said duct with the orifice of each tube and consequently in order to put said tubes 1 into communication with the pipe 22 and the analytical apparatus.

At the time of rotation of the turntable 6, said duct 20 is displaced with respect to the ring 4 and describes within this latter a succession of hypocycloid arcs. In point of fact, the diameter of the planet gear, the diameter of the turntable or of the ring 4, and the distribution of the tubes in the plate 2 can be such that, during a predetermined number of revolutions of the turntable, said hypocycloid passes through all the orifices of the sampling tubes and that the duct 20 thus puts each orifice in turn into communication with the measuring apparatus. It is even possible to obtain hypocycloids which form a closed loop after a certain number of revolutions of the turntable 6. The duct 20 is then located at its starting point after analysis of all the sampling tubes and is in readiness for guiding a further monitoring operation.

As shown in FIG. 2, the sampling tubes 1 are preferably disposed on the distribution plate 2 in six concentric circles 21, at the point of intersection of said circles with the hypocycloid arcs which are followed by the duct 20 of the planet gear.

For example, in the case of a diameter of the planet gear 14 of 224 mm., that is to say slightly smaller than one-half the diameter of the turntable 6 (512 mm.), one revolution of the turntable corresponds to two revolutions and $\frac{1}{16}$ of the planet gear and seven revolutions of the turntable enable the planet gear to be located once again at its starting point after having traveled along sixteen hypocycloid arcs which are nearly straight lines.

In FIG. 2, the initial position of the planet gear is that in which the duct 20 is located at A above a sampling tube located on the outer circumference 21. The rotation of the turntable 6 in the clockwise direction causes said duct 20 to follow a first hypocycloid arc which connects said point A to a second point B of the same outer circumference, then a second hypocycloid arc connecting said point B to a third point C. As the planet gear continues along its path, the duct 20 passes from the point C to a point D of the inner circumference, which corresponds to the end of the initial rotation of the turntable 6. All the tubes shown in thick lines in FIG. 2 have been monitored during this initial rotation of the turntable 6.

The following movements of rotation of said turntable 6 enable the duct 20 to follow the hypocycloid arcs shown in chain-dotted lines and thus to service in turn each of the sampling tubes which are shown in thin lines. After seven revolutions of the turntable 6, the duct 20 has traveled along the sixteen hypocycloid arcs and has returned to the point A. All the sampling tubes 1 have been monitored, and a certain number of tubes have even been monitored twice.

The tubes 1 are disposed on the distribution plate 2 at the point of junction of the circumferences and either one or the other of the hypocycloid arcs so that the angles of rotation of the planet gear which correspond to the transfer from one tube to the other are known and are always a multiple of 5°. The program of rotation of the planet gear as well as the program of stopping and starting of the turntable 6 can thus be readily established before hand and can be romote-controlled.

As shown in FIG. 3, the turntable 6 is preferably driven by means of a perforated sleeve 24 which is secured to the turntable 6 at the lower end. Said sleeve extends through the reactor vessel and through the vessel seal plug 25 to a point located externally of this latter at which said sleeve is rigidly fixed to a gear 26 in mesh with a pinion 28 which is coupled to a drive system (not shown) for controlling the rotation of the turntable and the planet gear.

Within the interior of said sleeve 24, a tube 30 is coupled to the sampling pipe 22 by means of a rotary seal 32. Said tube is stationary and has its opening at the top portion of a degassing box 34 which makes it possible by means of a system of baffles to discharge the coolant liquid in the direction of the reactor vessel and to discharge the gaseous fission products towards a conduit 36 which provides a connection with the external measuring apparatus (not shown in the drawings).

The method of driving the turnable varies, however, in accordance with the locating device in which the selector is mounted. In some cases, for example, the sleeve 24 does not exist and the turntable 6 is driven by means of a shaft placed in the line of extension of the shaft 16 which, at one of its extremities, passes through the seal plug 25 to be driven from the exterior and, at the other extremity, is coupled to the turntable 6 by means of a solid cone. The shaft 15 of the planet gear 14 is supported by said cone, in which the shaft is free to rotate and through which the pipe 22 passes, a rotary seal being employed to couple said pipe 22 to the tube 30 at the summit of said cone. Said tube 30 is carried by the rotary drive shaft and put into communication with a stationary degassing box which is placed externally of said shaft.

As in the case of driving by means of the sleeve 24, the sampling tubes are all put into communication one by one with the measuring apparatus.

Complete monitoring can be carried out rapidly and automatically. The position of the fuel assembly from which the fluid to be analyzed is derived is nevertheless always known with accuracy, thereby making it possible to localize defective assemblies both directly and without any delay.

A number of other modifications could clearly be made in the embodiment which has just been described without thereby departing from the scope of the invention; in particular, the arrangement of the sampling tubes on the distribution plate or the ratios of the diameters of the planet gear and of the turntable and the shape of the hypocycloid gear arcs vary as a function of the monitoring operation to be performed. A device for adjusting the starting position of the planet gear with respect to the ring 4 could be added.

What we claim is:

1. A sampling selector for burst can localization, comprising a distribution plate for tubes which serve to sample the coolant within all the fuel assemblies, an internally-toothed ring fixed on said plate around said tubes and constituting a sun gear, a turnable mounted to rotate within said sun gear and provided with at least one recess in which is mounted to rotate freely a toothed wheel engaged with said sun gear and constituting a planet gear, an eccentrically mounted duct for guiding the sampled fluid towards a measuring apparatus, said duct being adapted to pass through the planet gear and to open opposite to the distribution plate, and means for driving the turntable in rotation so as to cause the displacement the planet-gear duct above the tubes in a succession of hypocycloid arcs.

2. A selector in accordance with claim 1, wherein the diameters of the planet gear and of the turntable are such that the succession of hypocycloid arcs forms a closed curve.

3. A selector in accordance with claim 1, wherein the distribution plate is pierced by holes for fixing sampling tubes disposed on a plurality of coaxial circles, on the curve described by the orifice of the planet-gear duct.

4. A selector in accordance with claim 3, wherein the sampling tubes are disposed in the distribution plate on six concentric circles, and wherein the diameters of the turntable and of the planet gear are such that the curve described by the planet-gear duct is closed after seven revolutions of the turnables.

5. A selector in accordance with claim 1, wherein the turntable is rigidly fixed to a perforated sleeve driven in rotation which surrounds a box for degassing the products sampled by the selector and a tube for connecting the planet-gear duct to said box.

6. A selector in accordance with claim 1, wherein the turntable is rigidly fixed to a rotary shaft which supports a tube for connecting the planet-gear duct to a degassing box disposed externally of said shaft.

References Cited
UNITED STATES PATENTS

| 3,219,536 | 11/1965 | Butler et al. | 176—19 LD |
| 2,979,451 | 4/1961 | Pettinger | 176—19 LD |

REUBEN EPSTEIN, Primary Examiner

U.S. Cl. X.R.
137—625.11